United States Patent
Gupta et al.

(10) Patent No.: US 10,908,816 B2
(45) Date of Patent: Feb. 2, 2021

(54) ELECTRONIC DEVICE FOR PROVIDING PREDICTIVE WORD AND OPERATING METHOD THEREOF

(71) Applicant: Samsung Electronics Co., Ltd., Suwon-si (KR)

(72) Inventors: Ashutosh Gupta, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/695,678

(22) Filed: Nov. 26, 2019

(65) Prior Publication Data
US 2020/0167070 A1 May 28, 2020

(30) Foreign Application Priority Data
Nov. 26, 2018 (KR) .......................... 10-2018-0147468

(51) Int. Cl.
*G06F 3/0488* (2013.01)
*G06F 3/0482* (2013.01)
*G06F 3/023* (2006.01)

(52) U.S. Cl.
CPC ........ *G06F 3/04886* (2013.01); *G06F 3/0236* (2013.01); *G06F 3/0237* (2013.01); *G06F 3/0482* (2013.01)

(58) Field of Classification Search
None
See application file for complete search history.

(56) References Cited

U.S. PATENT DOCUMENTS

| 5,210,689 A * | 5/1993 | Baker ................... G06F 3/0489 704/1 |
| 7,175,438 B2 | 2/2007 | Levy |
| 8,930,813 B2 | 1/2015 | McMaster |

(Continued)

FOREIGN PATENT DOCUMENTS

| EP | 2 698 692 A1 | 2/2014 |
| KR | 10-2018-0007183 A | 1/2018 |

OTHER PUBLICATIONS

Németh et al. ("Word unit based multilingual comparative analysis of text corpora." In Seventh European Conference on Speech Communication and Technology. 2001) (Year: 2001).*

(Continued)

*Primary Examiner* — Amy M Levy
(74) *Attorney, Agent, or Firm* — Jefferson IP Law, LLP

(57) ABSTRACT

An electronic device for providing a predictive word to a user, and an operating method therefor are provided. The electronic device includes a display, a processor, and a memory. The memory stores instructions that, when executed, cause the processor to display a user interface including a text input area and a keyboard, on the display, receive a first input through the keyboard, the first input including a part of a word, predict at least one word on the basis of at least a portion of the part of the word in response to the first input, the at least one word including a length in a selected range, display the at least one word on the display, receive a second input for selecting one word among the at least one word through the display, and allow the selected word to be displayed on the text input area.

18 Claims, 13 Drawing Sheets

(56) References Cited

U.S. PATENT DOCUMENTS

| | | | |
|---|---|---|---|
| 2005/0210402 A1* | 9/2005 | Gunn | G06F 3/0236 |
| | | | 715/773 |
| 2010/0031143 A1* | 2/2010 | Rao | G10L 15/22 |
| | | | 715/261 |
| 2012/0036469 A1* | 2/2012 | Suraqui | G06F 40/242 |
| | | | 715/773 |
| 2012/0206367 A1* | 8/2012 | Griffin | G06F 3/0236 |
| | | | 345/169 |
| 2012/0268382 A1* | 10/2012 | Raguseo | G06F 3/0237 |
| | | | 345/168 |
| 2014/0237356 A1* | 8/2014 | Durga | G06F 3/0233 |
| | | | 715/256 |
| 2014/0240237 A1* | 8/2014 | Park | G06F 3/0237 |
| | | | 345/168 |
| 2015/0082158 A1* | 3/2015 | VanBlon | G06F 40/274 |
| | | | 715/261 |
| 2015/0293602 A1 | 10/2015 | Kay et al. | |
| 2016/0041965 A1* | 2/2016 | Ghassabian | G06F 3/04886 |
| | | | 715/261 |
| 2017/0351342 A1* | 12/2017 | Kandur Raja | G06F 3/04886 |
| 2018/0113852 A1* | 4/2018 | Song | G06F 40/279 |

OTHER PUBLICATIONS

International Search Report dated Mar. 18, 2020, issued in an International Application No. PCT/KR2019/016369.

* cited by examiner

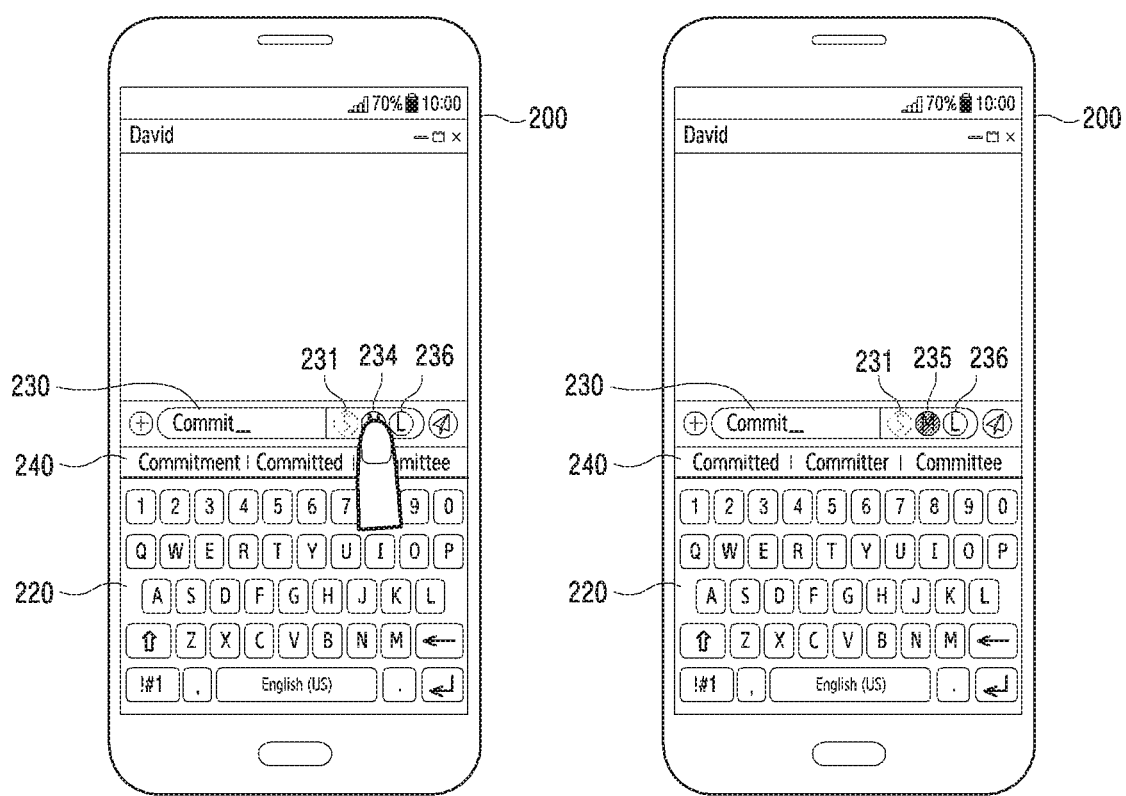

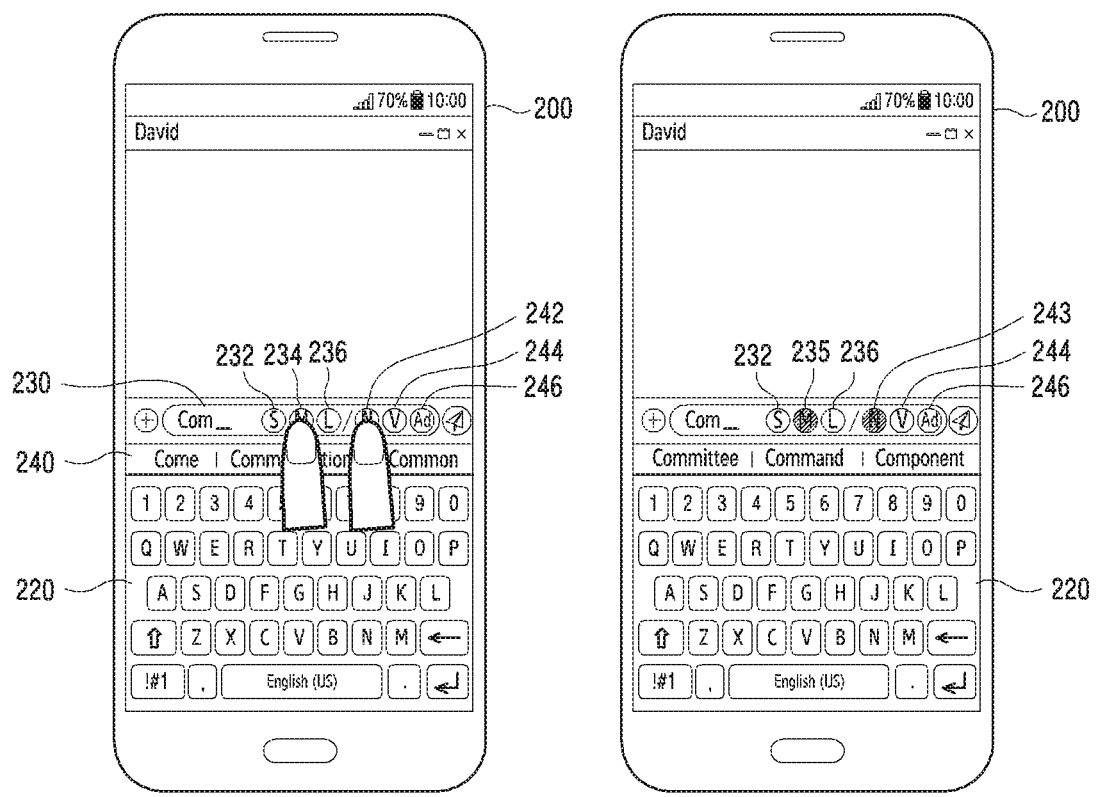
FIG.12A
FIG.12B
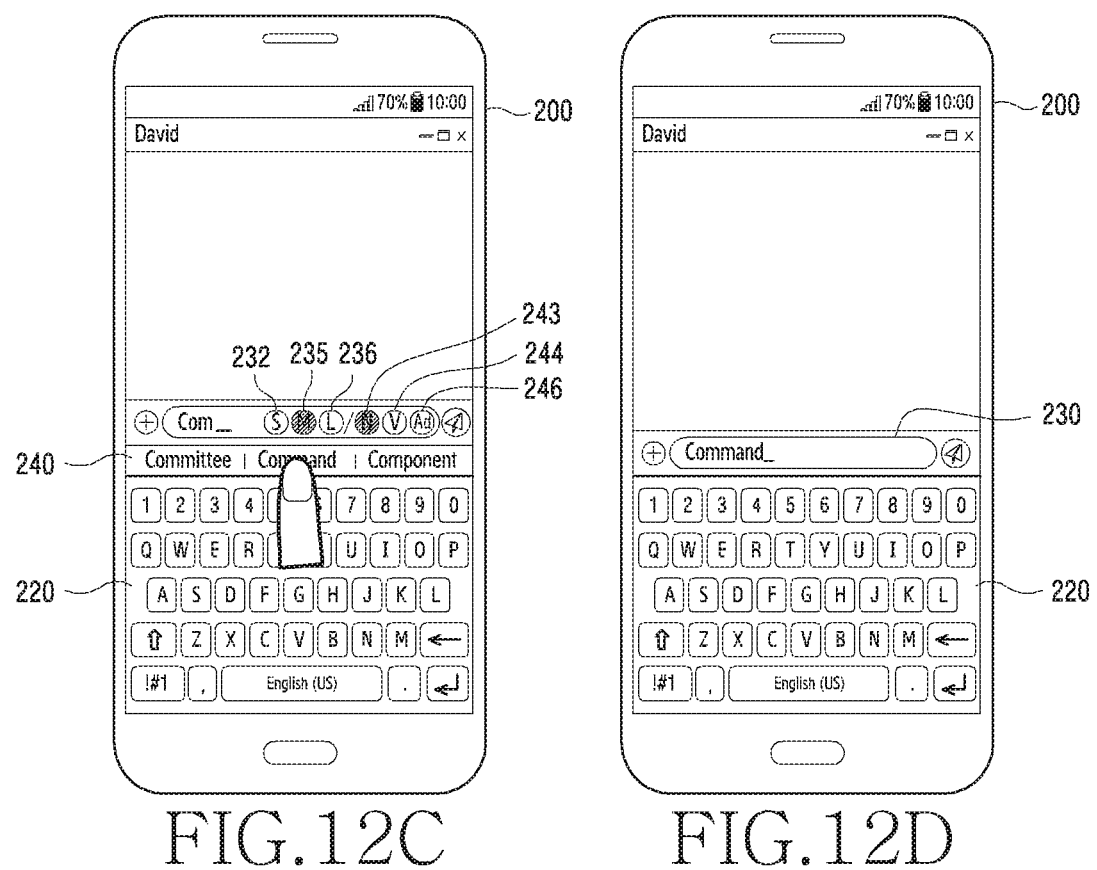
FIG.12C
FIG.12D

ELECTRONIC DEVICE FOR PROVIDING PREDICTIVE WORD AND OPERATING METHOD THEREOF

CROSS-REFERENCE TO RELATED APPLICATION(S)

This application is based on and claims priority under 35 U.S.C. § 119 of a Korean patent application number 10-2018-0147468, filed on Nov. 26, 2018, in the Korean Intellectual Property Office, the disclosure of which is incorporated by reference herein in its entirety.

BACKGROUND

1. Field

The disclosure relates to an electronic device for providing a predictive word to a user by using letters input by the user, and an operating method thereof.

2. Description of Related Art

A portable electronic device such as a smart phone is not limited to basic services, including a telephone call, text transmission, and the like, in providing services, but provides a user with various services, including financial services such as purchase of a product, entertainment services such as games, and the like. Accordingly, a portable electronic device includes various elements, including an input/output interface (e.g., a virtual keyboard displayed on a display), a biometric sensor (e.g., a fingerprint sensor), and the like, configured to acquire information of a user who is using the electronic device or acquire information from the user.

Among schemes for acquiring information input by the user, the most universal scheme is to acquire character data input by the user through a keyboard. For example, when the user converses with one or more friends via a messenger, the user may use a virtual keyboard displayed on the display of the electronic device. As another example, when the user inputs an address of a webpage or inputs personal identification information in order to use a financial service, or when the user makes note of a thought struck the user, the user may use the virtual keyboard displayed on the display of the electronic device.

Further, for the convenience of the user, when the user inputs a partially-misspelled word, the electronic device automatically corrects the error, or even when the user inputs only a part of an entire word, the electronic device predicts the entire word and provides the predicted entire word.

The above information is presented as background information only to assist with an understanding of the disclosure. No determination has been made, and no assertion is made, as to whether any of the above might be applicable as prior art with regard to the disclosure.

SUMMARY

When an electronic device provides a predictive word, in relation to a portable electronic device, the portable electronic device has a limited display space, and thus it is difficult for the portable electronic device to provide all predictive words to a user in most cases. The electronic device may determine a word to be provided to the user among the predicted words, on the basis of the current context (e.g., a predictive word class derived from a position in a sentence) and an input history of the user (e.g., whether a relevant word is a word previously input by the user).

However, the word intended by the user cannot be clearly predicted by utilizing only the input history of the user or the current context. For example, even when the input history of the user or the current context is utilized, 100 or more words can be predicted, and three to five words, which are very few words among the 100 or more words, may be provided to the user. In most cases, a user who cannot trust the provided predictive words manually inputs all letters of a word despite the inconvenience.

Aspects of the disclosure are to address at least the above-mentioned problems and/or disadvantages and to provide at least the advantages described below. Accordingly, an aspect of the disclosure is to provide a method for providing a predictive word to a user on the basis of the length of a word desired to be input by the user, and an electronic device therefor.

Additional aspects will be set forth in part in the description which follows and, in part, will be apparent from the description, or may be learned by practice of the presented embodiments.

In accordance with an aspect of the disclosure, an electronic device is provided. The electronic device includes a touch-screen display, at least one processor configured to be operatively connected to the touch-screen display, and a memory configured to be operatively connected to the at least one processor, wherein the memory is configured to store instructions that, when executed, cause the at least one processor to control the touch-screen display to display a user interface including a text input area and a keyboard, on the touch-screen display, receive a first input through the keyboard, the first input including a part of a word, in response to the first input, predict at least one word based on at least a portion of the part of the word, the at least one word including a length in a selected range, control the touch-screen display to display the at least one word on the touch-screen display, receive a second input for selecting one word among the at least one word through the touch-screen display, and allow the selected word to be displayed on the text input area.

In accordance with another aspect of the disclosure, an operating method of an electronic device is provided. The operating method includes displaying a user interface including a text input area and a keyboard, on a touch-screen display, receiving a first input through the keyboard, the first input including a part of a word, in response to the first input, predicting at least one word based on at least a portion of the part of the word, the at least one word including a length in a selected range, displaying the at least one word on the touch-screen display, receiving a second input for selecting one word among the at least one word through the touch-screen display, and displaying the selected word on the text input area.

An electronic device according to various embodiments provides a user with only a predictive word having a length in a designated range, on the basis of the user's input of a part of a word, and thus can provide a predictive word which more accurately reflects a user's intention.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 10A and 10B illustrate a change in a user interface provided by an electronic device in response to a user input according to various embodiments of the disclosure;

FIGS. 12A, 12B, 12C and 12D illustrate a user interface provided by an electronic device on the basis of the length of a word and a word class thereof according to various embodiments of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
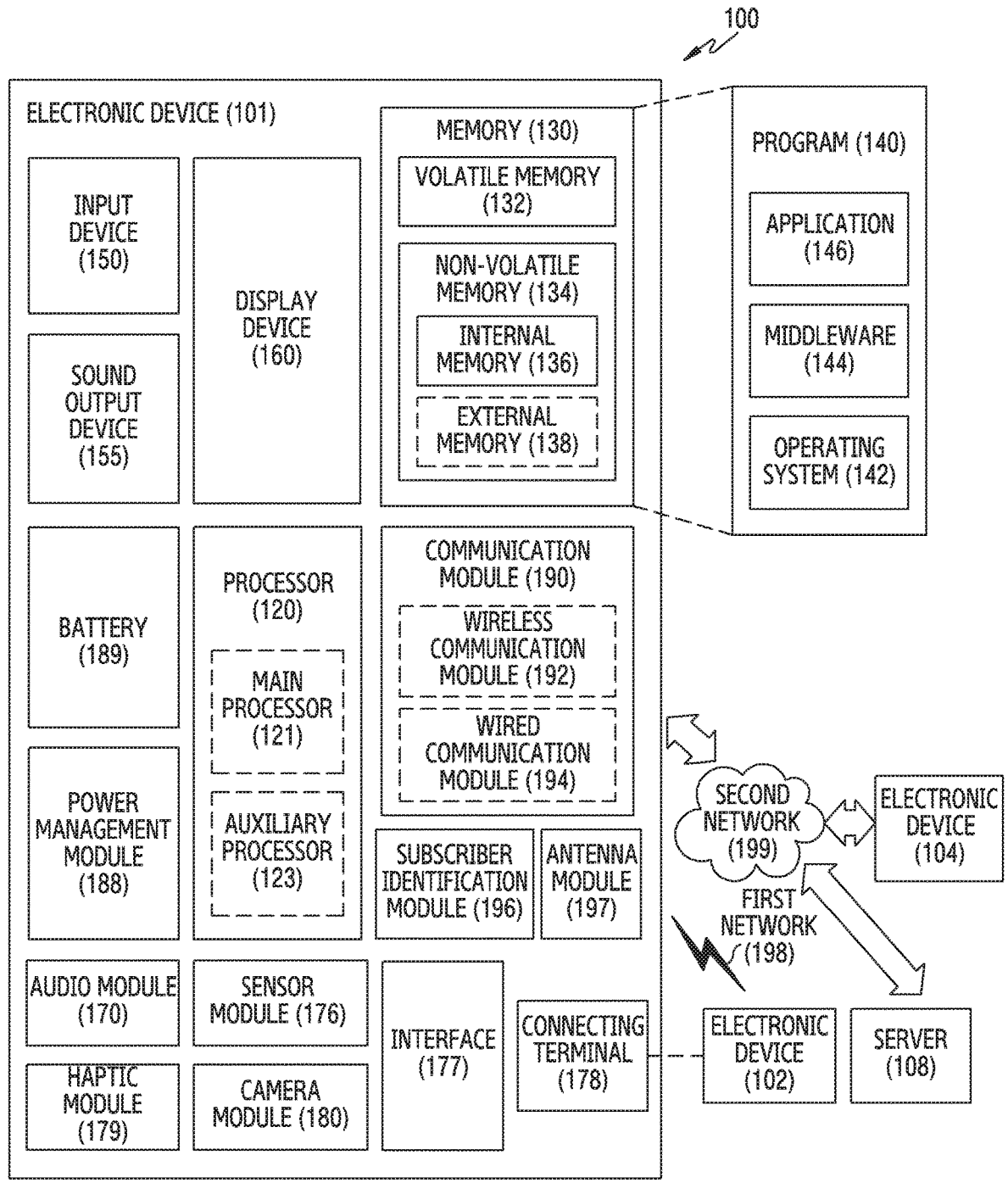
FIG. 1 is a block diagram illustrating a configuration of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190 (e.g., a transceiver), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
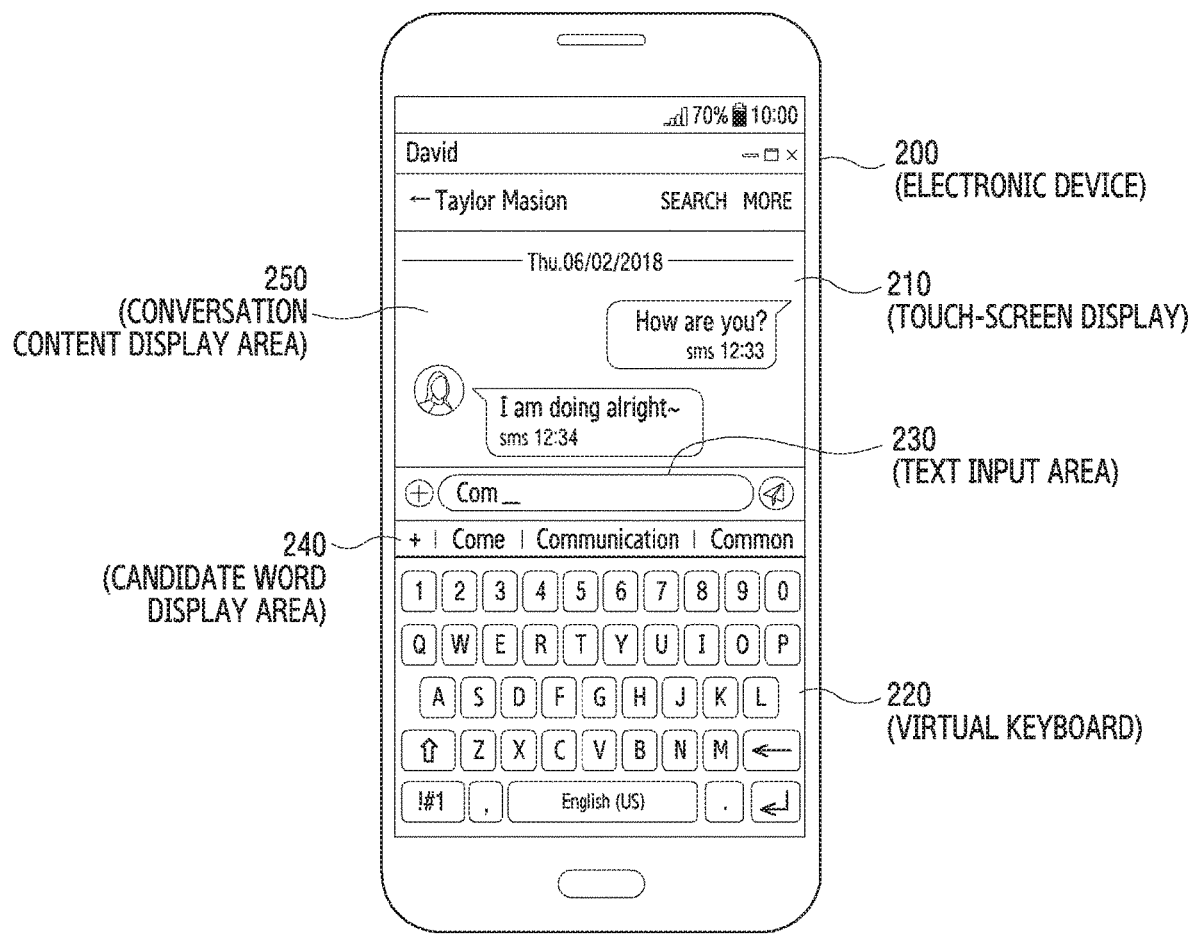
FIG. 2 illustrates a screen of an electronic device according to an embodiment of the disclosure.

FIG. 2 illustrates a screen of an electronic device according to an embodiment of the disclosure.

In an embodiment, an electronic device 200 may be the electronic device 101 disclosed in FIG. 1.

In an embodiment, the electronic device 200 may include a touch-screen display 210. The touch-screen display 210 may be the display apparatus 160 disclosed in FIG. 1. The touch-screen display 210 may display at least one content (e.g., an application execution screen). The touch-screen display 210 may also receive a touch input of a user.

Referring to FIG. 2, the touch-screen display 210 may display an execution screen of a messenger application including a virtual keyboard 220, and may receive a user input for a particular key (e.g., a key corresponding to the letter "c") of the virtual keyboard 220.

Figure 3:
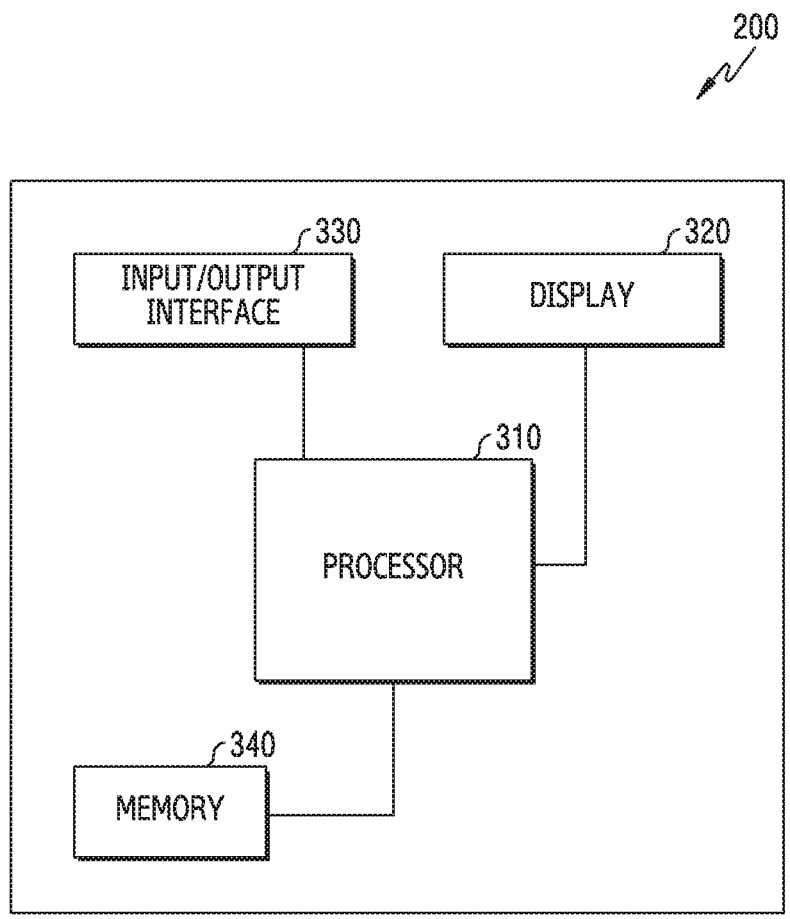
FIG. 3 is a block diagram illustrating a configuration of an electronic device according to an embodiment of the disclosure.

In an embodiment, in response to a user input or satisfaction of a pre-configured condition, the touch-screen display 210 may display a user interface under the control of a processor (e.g., the processor 310 of FIG. 3). For example, in response to a user input for execution of a messenger application, the touch-screen display 210 may display an execution screen of the messenger application including a user interface. For example, as disclosed in FIG. 2, the touch-screen display 210 may display a user interface (e.g., the virtual keyboard 220, a text input area 230, and a candidate word display area 240) configured to converse with another user (e.g., David).

In an embodiment, the text input area 230 may be an area for display of text determined on the basis of a user input through the virtual keyboard 220. The user may input a content (e.g., text) in the text input area 230 through an interface, such as the virtual keyboard 220. The user may display the text, displayed in the text input area 230, in a conversation content display area 250 or may delete the text without displaying the text in the conversation content display area 250. When any time point is configured as a reference time point, the user may complete an input of a finished word (e.g., "company") in the text input area 230, but may not complete the input of the finished word. For example, the user may input only a part (e.g., "com") of the finished word. In this example, the electronic device 200 may display one or more candidate words, predicted to be input by the user, in the candidate word display area 240 on the basis of a user input (hereinafter, a "first input") corresponding to an input of only a part of the finished word. For example, when the user inputs "com" as a part of the finished word, the electronic device 200 may display three candidate words (e.g., "come", "communication", and "common") starting with "com", in the candidate word display area 240.

In an embodiment, a display position and a display shape of the candidate word display area 240 may be variously implemented. As disclosed in FIG. 2, the candidate word display area 240 may be displayed between the text input area 230 and the virtual keyboard 220, or may be displayed between the text input area 230 and the conversation content display area 250. The size of the candidate word display area 240 may be changed according to the number of candidate words to be displayed. The candidate word display area 240 may also be configured such that a separate interface, such as a scroll bar, is added thereto instead of fixing the size thereof.

In an embodiment, the virtual keyboard 220 may be fixedly displayed, at least temporarily, on the screen. For example, the virtual keyboard 220 may be displayed in response to detection of a user input displayed in the text input area 230. As another example, display of the virtual keyboard 220 may be limited in response to detection of a user input for displaying a content (e.g., text), displayed in the text input area 230, in the conversation content display area 250.

In an embodiment, the virtual keyboard 220 may be implemented as multiple pages respectively corresponding to different languages. For example, the virtual keyboard 220 may be implemented as a first page corresponding to English and a second page corresponding to Korean.

As can be noted in FIG. 2, when the user inputs only "com", lengths of one or more candidate words provided by the electronic device 200 may not be specified. For example, the electronic device 200 may not only provide a candidate word including four letters (e.g., come), but may also provide a candidate word including six letters (e.g., common) and even a candidate word including 13 letters (e.g., communication). When the lengths (or a range of lengths) of candidate words are not specified as described above, there are a large number of candidate words (e.g., words starting with "com") provided by the electronic device 200, and thus it is unusual in practice to immediately provide the user with a word desired to be input by the user. Hereinafter, a description will be made of a specific embodiment in which the electronic device 200 specifies a length (or a range of a length) of a word on the basis of a user input (e.g., a first input or a separate input distinguished from the first input) and provides a user with one or more candidate words determined on the basis of the specified length (or the specified range of the length).

FIG. 3 is a block diagram illustrating a configuration of an electronic device according to an embodiment of the disclosure.

In an embodiment, the electronic device 200 may include a processor 310, a display 320, an input/output interface 330, and a memory 340.

In an embodiment, the display 320 may be the touch-screen display 210 disclosed in FIG. 2. The display 320 may display at least one content (e.g., a user interface). For example, the display 320 may display a user interface including a text input area (e.g., the text input area 230 of FIG. 2) and a keyboard (e.g., the virtual keyboard 220 of FIG. 2). The display 320 may receive a touch input from a user. For example, the display 320 may receive a first input of the user which allows not a whole of a word but a part thereof (hereinafter, a "first content") to be displayed (or input) in the text input area 230 through the keyboard 220. In an embodiment, the first content itself may constitute one word. For example, when the first content is "come", "come" itself is one word, but may also be a part of another word (e.g., "comet"), and thus may be an example of the first content of the disclosure.

In an embodiment, the input/output interface 330 may include an input interface configured to receive data as input from the user, and an output interface configured to provide the user with data or a content. The input/output interface 330 may be the interface 177 disclosed in FIG. 1. Although illustrated as separate units, the display 320 may be an example of an input/output interface. The input/output interface 330 may include an input interface such as a keyboard (e.g., a physical keyboard or a virtual keyboard) configured to receive text as input from the user, or a mouse, or an output interface such as a speaker or a vibration output apparatus.

In an embodiment, the memory 340 may be the memory 130 disclosed in FIG. 1. In an embodiment, the memory 340 may store instructions which cause the electronic device 200 to perform one or more operations according to an embodiment under the control of the processor 310. For example, the memory 340 may store instructions which cause the processor 310 to predict at least one candidate word on the basis of at least a part of a first content in response to a first input.

In another embodiment, the memory 340 may also store historical data about previous input by the user (e.g., word data input, in the past, by the user in the text input area 230).

In still another embodiment, the memory 340 may store a database of words (or a combination of one or more words) so as to allow prediction of at least one word on the basis of at least a part of a first content.

In an embodiment, the processor 310 may generally control an operation of the electronic device 200. The processor 310 may identify a user input received as input through the input/output interface 330, and may process a corresponding command (e.g., may execute a corresponding application) or may control the display 320 to display a corresponding screen. For example, the processor 310 may predict at least one word on the basis of at least a part of a first content in response to reception of a first input, and may control the display 320 to display the predicted at least one word. Although not illustrated, the processor 310 may separately include a word prediction module (not illustrated), and the word prediction module (not illustrated) may receive data on at least a part of a first content, and may store instructions for prediction of at least one word on the basis of the received data and a particular length range.

Figure 4:
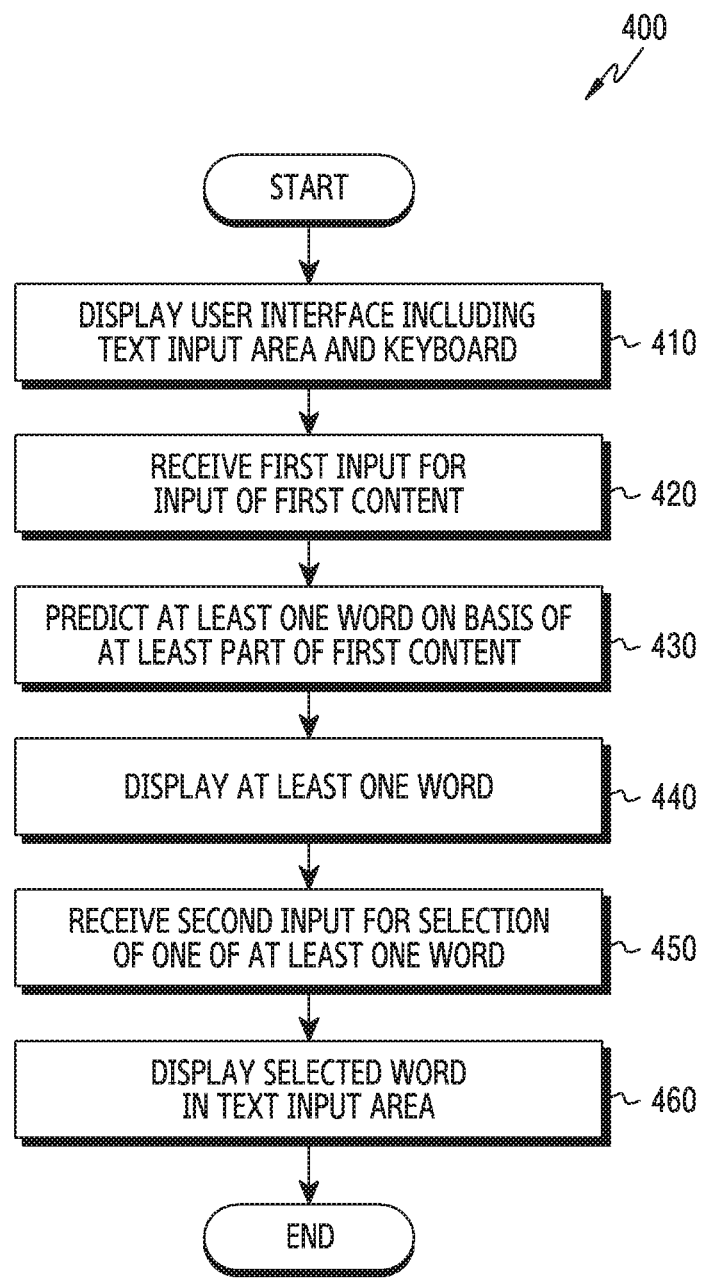
FIG. 4 illustrates a flow of operations of providing a predictive word by an electronic device according to an embodiment of the disclosure.

FIG. 4 illustrates a flow 400 of operations of providing a predictive word by an electronic device according to an embodiment of the disclosure.

Referring to FIG. 4 may be performed by the electronic device 200 of FIG. 2 under the control of the processor 310 of FIG. 2. Hereinafter, the electronic device 200 will be described as performing the operations disclosed in FIG. 4.

In operation 410, the electronic device 200 may display (or provide) a user interface including a text input area (e.g., the text input area 230 of FIG. 2) and a keyboard (e.g., the virtual keyboard 220 of FIG. 2). The electronic device 200 may display a user interface in response to a user input or satisfaction of a pre-configured condition. For example, the electronic device 200 may display a user interface including a text input area and a keyboard, on a display (e.g., the display 320 of FIG. 3) in response to a user input for activation of a messenger application (e.g., execution of a messenger application or display of the same in the foreground).

In operation 420, the electronic device 200 may receive a first input for input of a first content. The electronic device 200 may receive a first input for input of a first content in the text input area 230. The first input may be input through the keyboard 220. The first content may be not a whole of a word but a part thereof. For example, the first content may be "com" which is a part of "communication".

In operation 430, the electronic device 200 may predict at least one word. The electronic device 200 may predict at least one word on the basis of at least a part of the first content. For example, the electronic device 200 may predict at least one word including a whole of the first content. In this example, the electronic device 200 may predict at least one word starting with the first content. For example, when the first content is "com", the electronic device 200 may predict at least one word starting with "com" (e.g., "communication"). As another example, the electronic device 200 may also predict at least one word including not the whole of the first content but a part thereof.

In an embodiment, the electronic device 200 may predict at least one word on the basis of at least a part of the first content and a particular length range. The electronic device 200 may specify a length range by using an input characteristic of the first input or a separate input distinguished from the first input, and may predict at least one word on the basis of the specified length range and at least a part of the first content. Specific embodiments will be disclosed with reference to FIG. 5 to FIGS. 8A, 8B, 8C, and 8D.

In operation 440, the electronic device 200 may display the at least one word. For example, the electronic device 200 may display the at least one word (e.g., "communication", "common", and "come") predicted in operation 430 in a candidate word display area (e.g., the candidate word display area 240 disclosed in FIG. 2).

In operation 450, the electronic device 200 may receive a second input for selection of one of the at least one word. For example, the electronic device 200 may receive a second input for selection of one (e.g., "communication") of the at least one word (e.g., "communication", "common", and "come") displayed in the candidate word display area 240.

In operation 460, the electronic device 200 may display the selected word in the text input area 230. For example, the electronic device 200 may replace the first content, displayed in the text input area 230, by the selected word, and may display the selected word, by which the first content is replaced, in the text input area 230.

Figure 5:
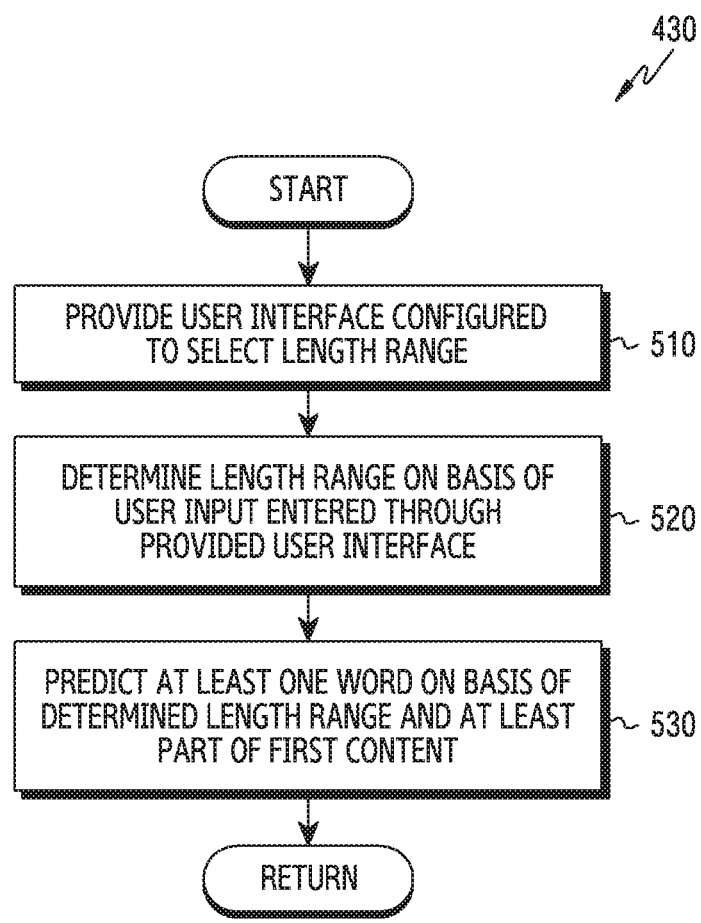
FIG. 5 illustrates a flow of specific operations of predicting at least one word by an electronic device according to an embodiment of the disclosure.

FIG. 5 illustrates a flow of specific operations of predicting at least one word by an electronic device according to an embodiment of the disclosure.

Referring to FIG. 5, FIG. 5 may be specific operations of operation 430 disclosed in FIG. 4.

In operation 510, the electronic device 200 may provide a user interface configured to specify a length range.

In an embodiment, the electronic device 200 may provide a user interface configured to specify a length range in the text input area 230, or may provide a user interface configured to specify a length range outside the text input area 230 (e.g., between the text input area 230 and the conversation content display area 250).

In an embodiment, the electronic device 200 may provide a user interface configured to specify a length range, regardless of whether a content is displayed (or input) in the text input area 230. For example, the electronic device 200 may provide a user interface including the text input area 230 and the keyboard, and simultaneously, may provide a user interface configured to specify a length range. In another embodiment, only when a content is displayed in the text input area 230, the electronic device 200 may provide a user interface configured to specify a length range. For example, when the text input area 230 is blank, the electronic device 200 does not provide a user interface configured to specify a length range, but when a content (e.g., at least one letter) is displayed (or input) in the text input area 230, may provide the user interface configured to specify a length range.

In an embodiment, a user interface configured to specify a length range may include two or more icons (or buttons) corresponding to different length ranges (e.g., a first range or a second range which is not included in the first range). For example, the user interface configured to specify a length range may include an S icon corresponding to a short length, an M icon corresponding to a medium length, and an L icon corresponding to a long length. The electronic device 200 may separately provide an interface through which a user can set the number of letters corresponding to each of a short length, a medium length, and a long length. For example, the electronic device 200 may receive the user's configuration which causes a short length corresponding to the S icon to correspond to six letters or less with reference to an alphabet.

In operation 520, the electronic device 200 may determine a length range on the basis of a user input entered through the provided user interface. For example, the electronic device 200 may determine a length range as 6 or less with reference to the number of letters, in response to detection of a user input for selection of the S icon. As another example, the electronic device 200 may determine a length range as 7-9 inclusive with reference to the number of letters, in response to detection of a user input for selection of the M icon.

In operation 530, the electronic device 200 may predict at least one word on the basis of the determined length range and at least a part of the first content. In an embodiment, the electronic device 200 may extract at least one word including at least a part of the first content (or starting with at least a part of the first content) from among multiple words belonging to the determined length range. In another embodiment, the electronic device 200 may extract at least one word belonging to the determined length range from among multiple words including at least a part of the first content (or starting with at least a part of the first content). For example, the electronic device 200 may determine "come" and "common", the number of letters of each of which is 6 or less, among the multiple words ("come", "communication", and "common") including at least a part of the first content.

Figure 6A:
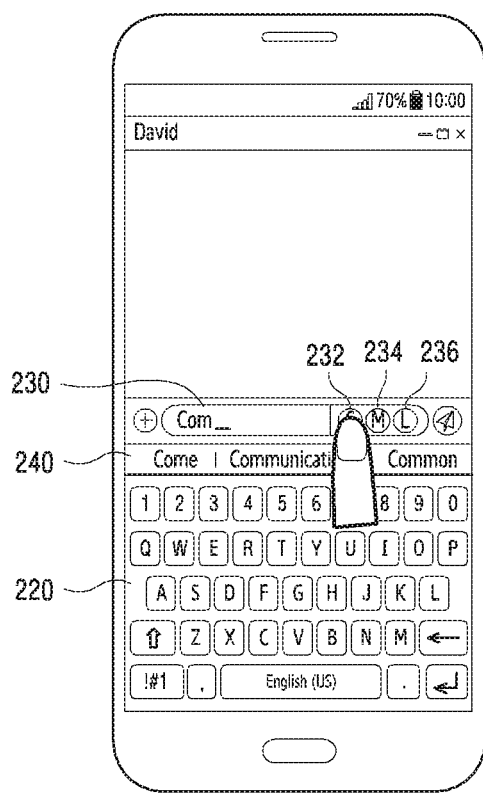
FIGS. 6A, 6B, 6C and 6D illustrate a user interface provided by an electronic device according to various embodiments of the disclosure.
Figure 6B:
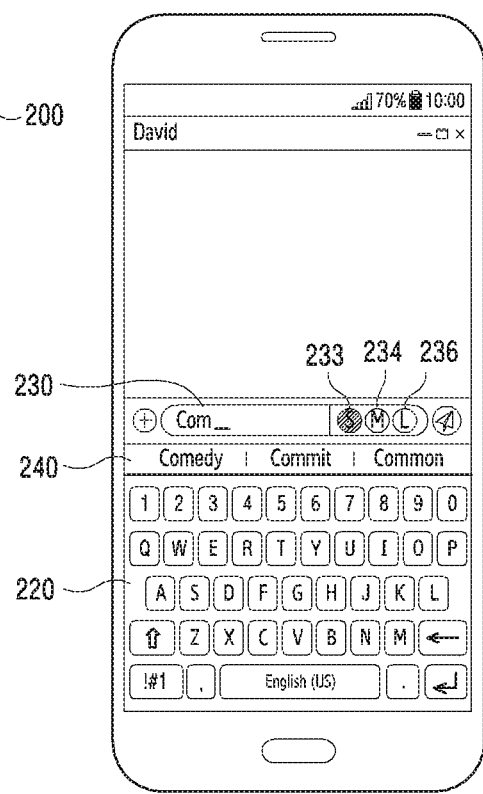
Figure 6C:
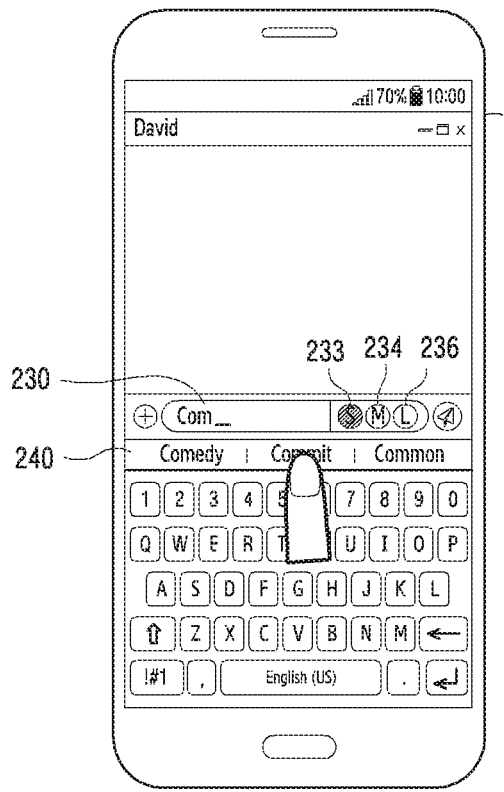
Figure 6D:
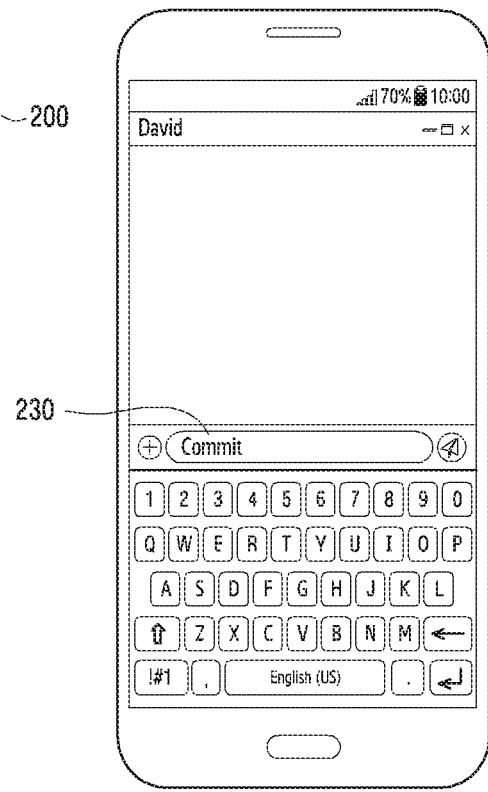

FIG. 6A illustrates a user interface provided by an electronic device according to various embodiments, FIG. 6B illustrates a user interface provided by an electronic device according to various embodiments, FIG. 6C illustrates a user interface provided by an electronic device according to various embodiments, and FIG. 6D illustrates a user interface provided by an electronic device according to various embodiments.

Referring to FIG. 6A, the electronic device 200 may display a user interface including the text input area 230 and the keyboard 220. The electronic device 200 may detect, through the keyboard 220, a first input for display of a first content ("corn") in the text input area 230, and may display the first content in the text input area 230.

When the electronic device 200 detects that a part (e.g., "c") of the first content ("corn") is displayed in the text input area 230, the electronic device 200 may provide a user interface configured to specify a length range. The user interface configured to specify a length range may include multiple icons 232, 234, and 236 respectively corresponding to different lengths (or the number of letters). The electronic device 200 may display the multiple icons 232, 234, and 236 in the text input area 230, for example, at a right end part of the text input area 230.

In an embodiment, the electronic device 200 may display the candidate word display area 240 between the text input area 230 and the keyboard 220. Even when a user input entered through the user interface configured to specify a length range is not detected, the electronic device 200 may display at least one word in the candidate word display area 240. For example, the electronic device 200 may display at least one word (e.g., "come", "communication", and "common"), which starts with the first content ("corn") and is displayed in the text input area 230, in the candidate word display area 240.

In an embodiment, the electronic device 200 may receive (or detect) a user input for one of (or for selection one of) the multiple icons 232, 234, and 236. For example, the electronic device 200 may receive a user input for the S icon 232.

Referring to FIG. 6B, the electronic device 200 may change display of the selected icon 232 in response to reception (or detection) of the user input for one of (or for selection one of) the multiple icons 232, 234, and 236. For example, the electronic device 200 may display an S icon 233 having an oblique-line pattern added thereto.

In an embodiment, in response to reception of a user input for one of the multiple icons 232, 234, and 236, the electronic device 200 may predict at least one word, and may display the same in the candidate word display area 240. The electronic device 200 may determine a length range corresponding to the selected icon (e.g., the S icon 232), and may predict at least one word on the basis of the determined length range and at least a part of the first content. For example, the electronic device 200 may determine a length range (6 or less with reference to the number of letters) corresponding to the selected S icon 232, may determine at least one word (e.g., "comedy", "commit", and "common") which starts with the first content and is in the determined length range, and may display the determined word in the candidate word display area 240. In an embodiment, the electronic device 200 may display at least one word (or a word list) in a case where at least some words (e.g., "common") coincide with a word list having been displayed in the candidate word display area 240 before the S icon 232 is selected. In another embodiment, the electronic device 200 may display at least one word (or a word list) in a case where at least some words do not coincide with a word list having been displayed in the candidate word display area 240 before the S icon 232 is selected.

Referring to FIG. 6C, the electronic device 200 may receive a user input (hereinafter, a "second input") for selection of one word from among at least one word displayed in the candidate word display area 240. For example, the electronic device 200 may receive a second input for selection of one word (e.g., "commit") from among at least one word (e.g., "comedy", "commit", and "common") displayed in the candidate word display area 240.

Referring to FIG. 6D, the electronic device 200 may display the selected word in the text input area 230 in response to detection of the second input for selection of one word from among the at least one word. For example, the electronic device 200 may display the selected word ("commit") instead of the first content ("com") in the text input area 230 in response to detection of a second input for selection of "commit" from among the at least one word.

In an embodiment, the electronic device 200 may not display a user interface configured to specify a length range, in response to detection of the second input or in response to display of the selected word in the text input area 230. Although not illustrated, even after the selected word is displayed in the text input area 230, the electronic device 200 may maintain display of the user interface configured to specify a length range.

In an embodiment, the electronic device 200 may not display a candidate word display area in response to detection of the second input or in response to display of the selected word in the text input area 230. Although not illustrated, even after the selected word is displayed in the text input area 230, the electronic device 200 may maintain display of the candidate word display area.

Figure 7:
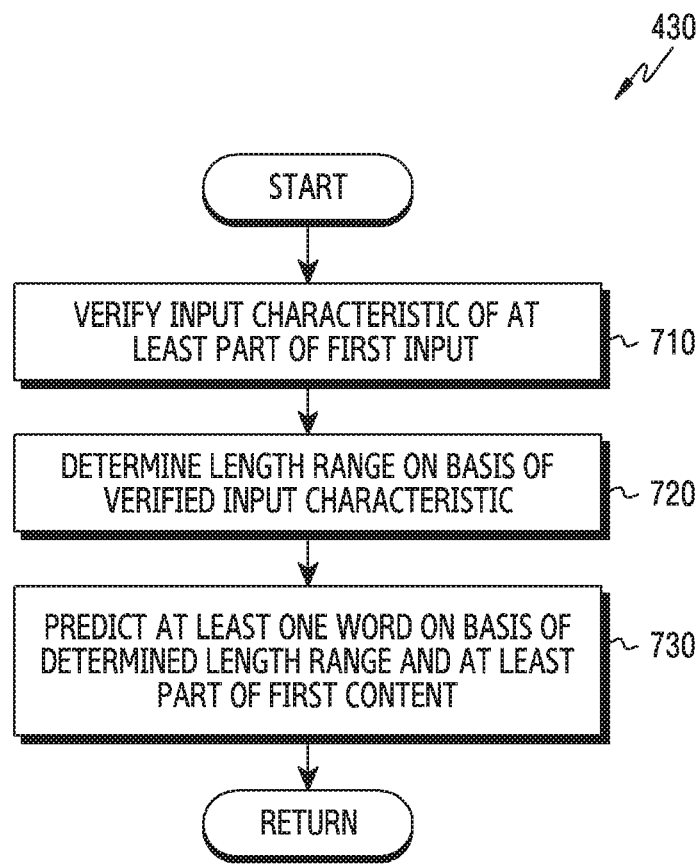
FIG. 7 illustrates a flow of specific operations of predicting at least one word by an electronic device according to an embodiment of the disclosure.

FIG. 7 illustrates a flow of specific operations of predicting at least one word by an electronic device according to an embodiment of the disclosure.

Referring to FIG. 7, FIG. 7 may be specific operations of operation 430 disclosed in FIG. 4.

In operation 710, the electronic device 200 may verify an input characteristic of at least a part of the first input. For example, the electronic device 200 may verify an input characteristic of at least a part of the first input (when the first input includes multiple inputs, the last input element, for example, when the first content is "com", an input through a key corresponding to "m" in the keyboard 220) for input of the first content (e.g., "com") in the text input area 230.

In an embodiment, an input characteristic may include at least one of a time for which an input is maintained, the touch area of the input, a body part causing the input (e.g., skin or nail), and the type of input (or gesture) (e.g., tap, tap and hold, or double tap).

In operation 720, the electronic device 200 may determine a length range on the basis of the verified input characteristic.

In an embodiment, the electronic device 200 may determine (or specify) a length range according to a time for which an input is maintained. For example, when at least a part (e.g., an input through a key corresponding to "m" in the keyboard 220) of the first input is continuously maintained for a predetermined first time (e.g., 1.2 sec) or longer, the electronic device 200 may specify a length range (e.g., 10 or more with reference to the number of letters) identically to a case in which the L icon 236 is selected in FIG. 6A. As another example, when at least a part (e.g., an input through a key corresponding to "m" in the keyboard 220) of the first input is not continuously maintained for a predetermined second time (e.g., 0.6 sec) or longer, the electronic device 200 may specify a length range (e.g., 6 or less with reference to the number of letters) identically to a case in which the S icon 232 is selected in FIG. 6A. As still another example, when at least a part of the first input is maintained for the predetermined second time to the predetermined first time inclusive, the electronic device 200 may specify a length range (e.g., 7-9 inclusive with reference to the number of letters) identically to a case in which the M icon 234 is selected in FIG. 6A.

In an embodiment, the electronic device 200 may also determine a length range according to a body part performing an input. For example, when at least a part (e.g., an input through a key corresponding to "m" in the keyboard 220) of the first input is performed using the user's nail, the electronic device 200 may specify a length range (e.g., 10 or more with reference to the number of letters) identically to a case in which the L icon 236 is selected in FIG. 6A.

In operation 730, the electronic device 200 may predict at least one word on the basis of the determined length range and at least a part of the first content. The electronic device 200 may determine at least one word (e.g., "commitment", "complement", and "compliance") which is in the determined length range (e.g., 10 or more with reference to the number of letters) and starts with the first content ("com").

FIGS. 8A, 8B, 8C and 8D illustrate a user interface provided by an electronic device on the basis of an input characteristic of a user input according to various embodiments of the disclosure.

Figure 8A:
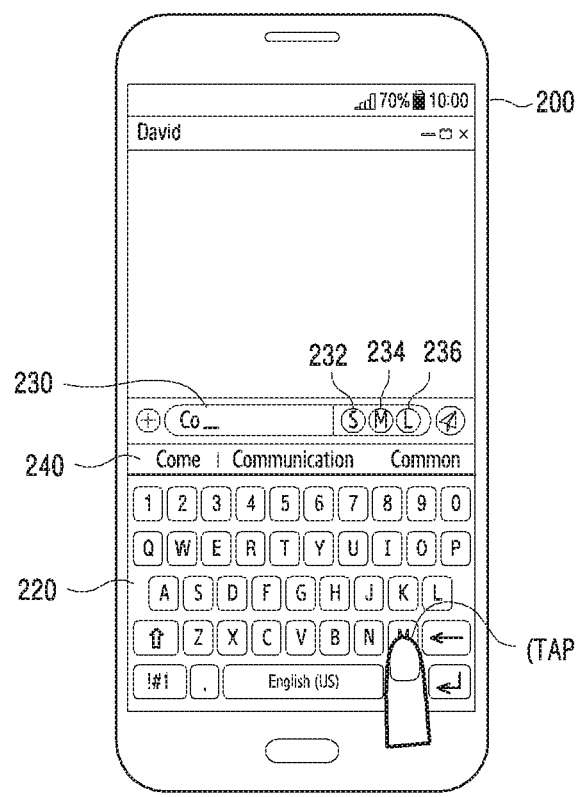
FIGS. 8A, 8B, 8C and 8D illustrate a user interface provided by an electronic device on the basis of an input characteristic of a user input according to various embodiments of the disclosure.

Referring to FIG. 8A, the electronic device 200 may display the text input area 230, the keyboard 220, and the multiple icons 232, 234, and 236 respectively corresponding to different lengths.

The electronic device 200 may detect a tap-and-hold input through a key corresponding to "m" in the keyboard 220, in a state where "co" is input in the text input area 230.

Figure 8B:
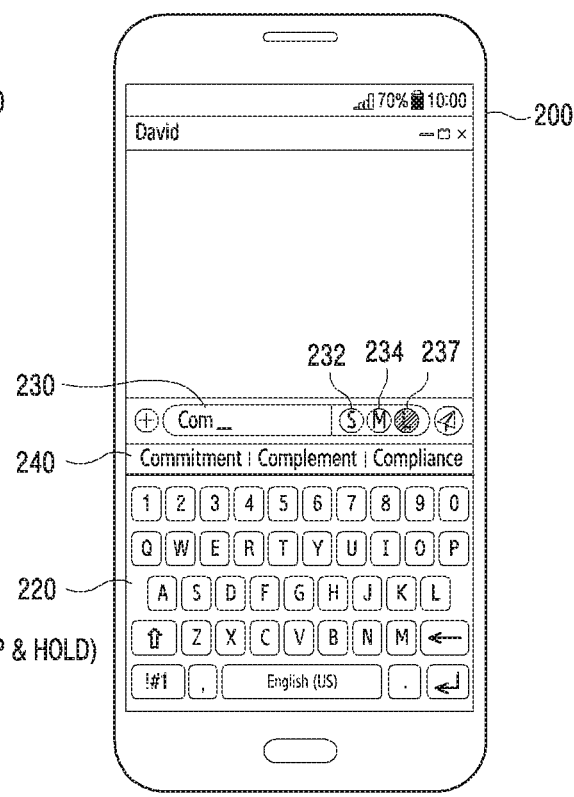

Referring to FIG. 8B, in response to detection of the tap-and-hold input through the key corresponding to "m" in the keyboard 220, the electronic device 200 may add "m" in the text input area 230 in which "co" is input, and simultaneously, may display an L icon 237 having an oblique-line pattern added thereto, as in a case in which the L icon 236 is selected. Further, the electronic device 200 may display at least one word (e.g., "commitment", "complement", and "compliance"), which is in a length range corresponding to the L icon 236 and starts with a first content ("com") displayed in the text input area 230, in the candidate word display area 240.

In an embodiment, multiple icons corresponding to different lengths may be arranged in the keyboard 220.

Figure 8C:
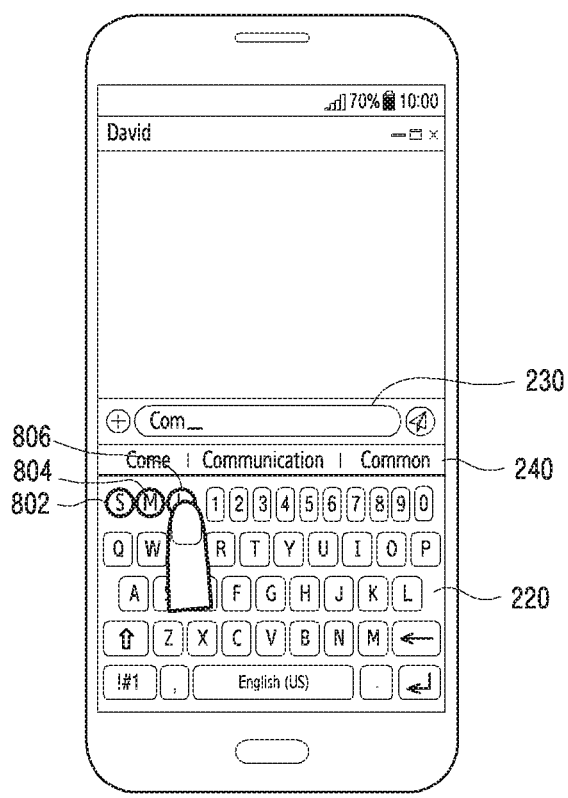

Referring to FIG. 8C, the electronic device 200 may display multiple icons 802, 804, and 806 corresponding to different lengths in a designated area (e.g., an uppermost left part) of the keyboard 220.

Figure 8D:
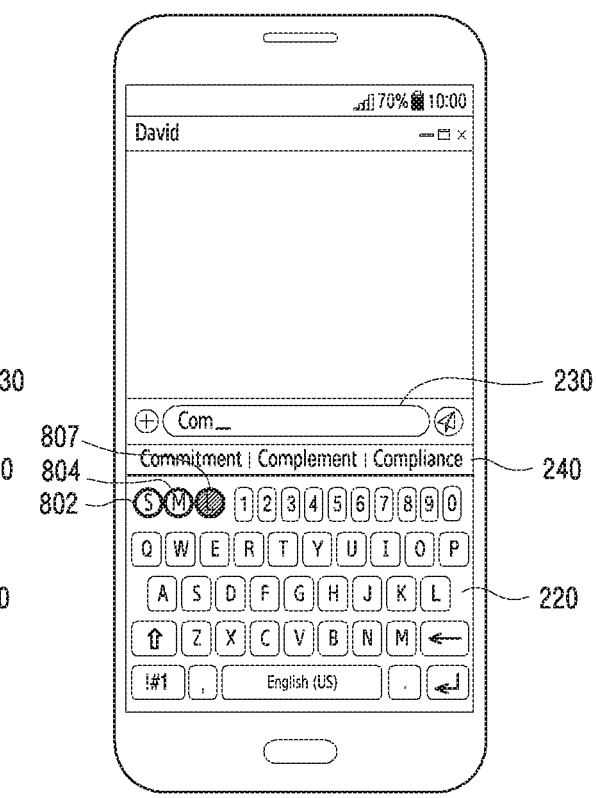

In an embodiment, the electronic device 200 may detect a user input for the L icon 806 displayed in a designated area of the keyboard 220, in a state where "com" is displayed in the text input area 230 and "come", "communication", and "common" are displayed in the candidate word display area 240. In this example, as illustrated in FIG. 8D, the electronic device 200 may display "commitment", "complement", and "compliance" in the candidate word display area 240, and may display the L icon 807 having an oblique-line pattern added thereto.

Figure 9A:
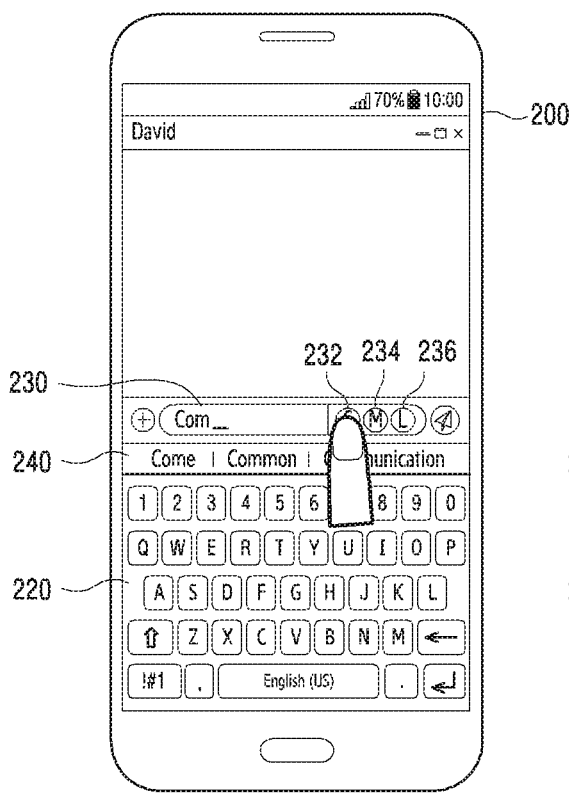
FIGS. 9A, 9B and 9C illustrate a change in a user interface provided by an electronic device in response to a user input according to various embodiments of the disclosure.
Figure 9B:
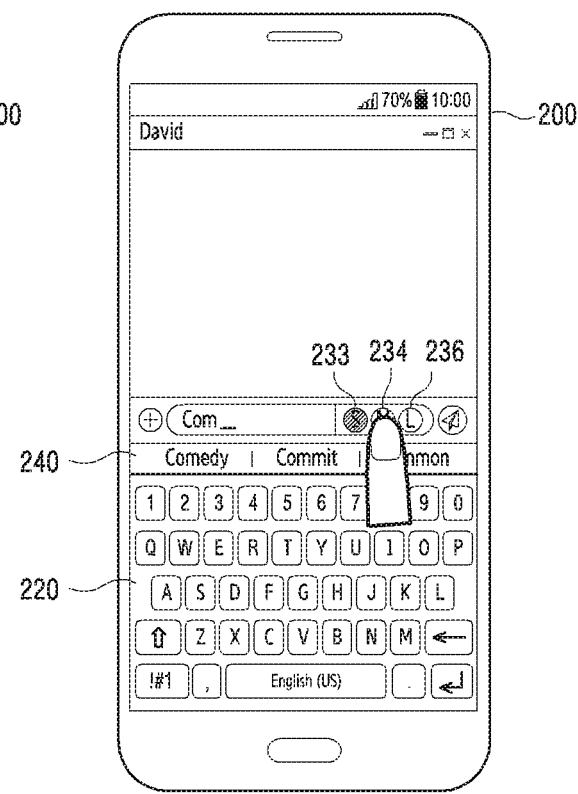
Figure 9C:
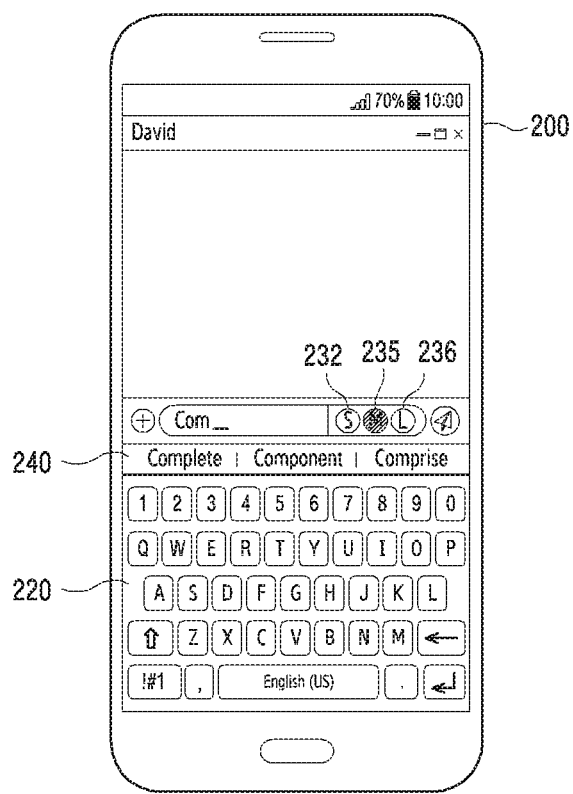

FIGS. 9A, 9B and 9C illustrate a change in a user interface provided by an electronic device in response to a user input according to various embodiments of the disclosure.

Referring to FIG. 9A, the electronic device 200 may display the text input area 230, the keyboard 220, and the multiple icons 232, 234, and 236 respectively corresponding to different lengths. The electronic device 200 may detect a user input for selection of the S icon 232, in a state where "com" is input in the text input area 230.

Referring to FIG. 9B, in response to detection of the user input for selection of the S icon 232, the electronic device 200 may display an S icon 233 having an oblique-line pattern added thereto, and simultaneously, may display, in the candidate word display area 240, at least one word (e.g., "comedy", "commit", and "common") which is in a length range (e.g., 6 or less with reference to the number of letters) corresponding to the S icon 232 and starts with a first content ("com") displayed in the text input area 230.

In an embodiment, in a state where the at least one word, which is in the length range corresponding to the S icon 232 and starts with the first content ("com") displayed in the text input area 230, is displayed in the candidate word display area 240, the electronic device 200 may receive a user input for changing a length range, instead of a second input for selection of one of the at least one word displayed in the candidate word display area 240. For example, the electronic device 200 may receive a user input for selection of the M icon 234.

Referring to FIG. 9C, in response to reception of the user input for selection of the M icon 234, the electronic device 200 may display the S icon 232 obtained by removing the oblique-line pattern, and may display an L icon 235 having an oblique-line pattern added thereto. Further, the electronic device 200 may display, in the candidate word display area 240, at least one word (e.g., "complete", "component", and "comprise") which is in a length range corresponding to the M icon 234 and starts with a first content ("com") displayed in the text input area 230, instead of at least one word (e.g., "comedy", "commit", and "common") which is in a length range corresponding to the S icon 232.

According to the embodiment disclosed in FIGS. 9A, 9B, and 9C, even when a user makes a mistake in selecting a desired icon, the electronic device 200 allows the user to easily reselect a desired icon.

FIGS. 10A and 10B illustrate a change in a user interface provided by an electronic device in response to a user input according to various embodiments of the disclosure.

Referring to FIG. 10A, the electronic device 200 may display the text input area 230, the keyboard 220, the candidate word display area 240, and multiple icons 231, 234, and 236 respectively corresponding to different lengths. In this regard, since the S icon 231 is deactivated differently from the M icon 234 and the L icon 236 which are activated, a user may not enter an input for the S icon 231.

The S icon 231, which is deactivated differently from the M icon 234 and the L icon 236, may be caused by the length of a first content input in the text input area 230. For example, when the first content input in the text input area 230 is "commit" and has a length of 6 with reference to the number of letters, the deactivated S icon 231 may be displayed. This is because a length range corresponding to the S icon 231 is 6 or less with reference to the number of letters and there is a low possibility that the user will input a word, the length of which is in the length range corresponding to the S icon 231.

Although not illustrated, the deactivated S icon 231 may be displayed only when a first content, the length of which exceeds the length range corresponding to the S icon 231, (e.g., text, the number of letters of which is 7 or more) is input in the text input area 230.

In an embodiment, the electronic device 200 may detect a user input for selection of the M icon 234 from among the M icon 234 and the L icon 236 which are activated.

Referring to FIG. 10B, the electronic device 200 may determine at least one word ("committed", "committer", and "committee") which has a length belonging to a length range (e.g., 7-9 inclusive with reference to the number of letters) corresponding to the M icon 234 and starts with the first content ("commit"), and display the same in the candidate word display area 240. In response to detection of a user input for selection of the M icon 234, the electronic device 200 may display the M icon 235 having an oblique-line pattern added thereto.

Figure 11A:
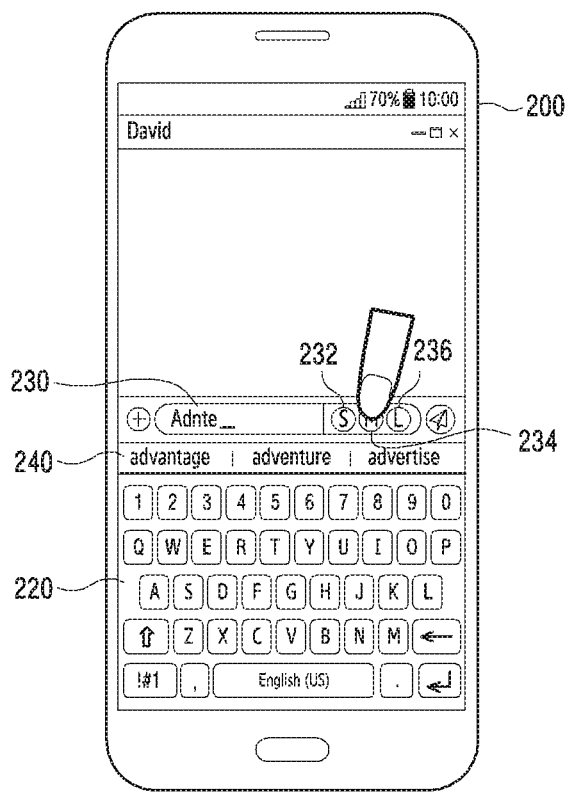
FIGS. 11A, 11B and 11C illustrate a user interface provided by an electronic device on the basis of some of letters input by a user according to various embodiments of the disclosure.
Figure 11B:
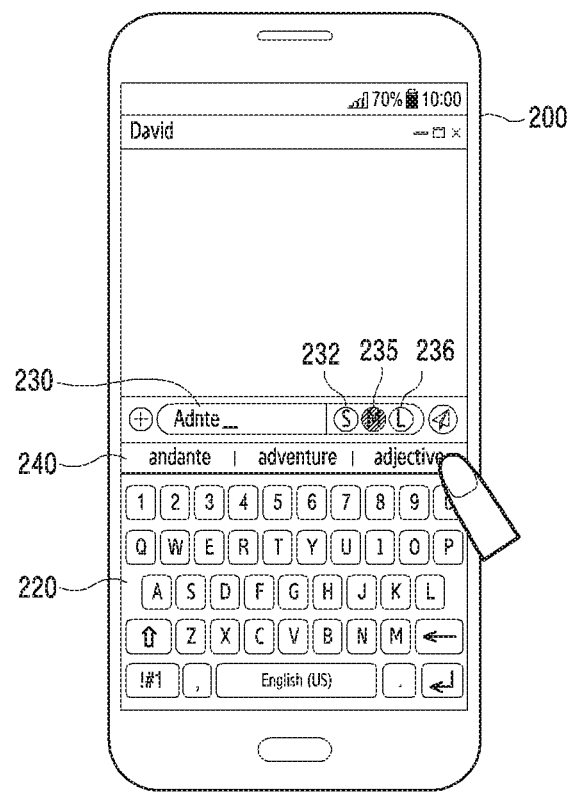
Figure 11C:
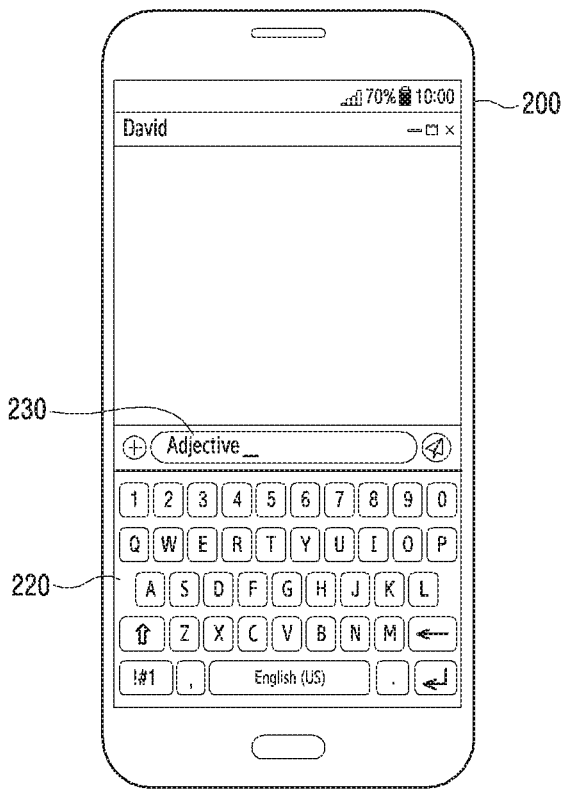

FIGS. 11A, 11B and 11C illustrate a user interface provided by an electronic device on the basis of some of letters input by a user according to various embodiments of the disclosure.

Referring to FIG. 11A, the electronic device 200 may display the text input area 230, the keyboard 220, the candidate word display area 240, and the multiple icons 232, 234, and 236 respectively corresponding to different lengths. A first content ("Adnte") is input (or displayed) in the text input area 230, and at least one word (e.g., "advantage", "adventure", and "advertise") including at least a part of the first content may be displayed in the candidate word display area 240. In the word displayed in the candidate word display area 240, the letters constituting the first content do not need to be arranged in the same order as that of the first content. For example, "advantage" displayed in the candidate word display area 240 includes all the letters (a, d, n, t, and e) constituting the first content ("adnte"), but is neither consecutive in the same manner as in the first content, nor is arranged in the same order as that of the first content. The word (e.g., "advertise") displayed in the candidate word display area 240 does not need to include all the letters constituting the first content.

Referring to FIG. 11A, the at least one word displayed in the candidate word display area 240 may not start with the first content, and may not include the entire first content as a part of the word. This is because no word starting with the first content exists, or no word including the entire first content as a part thereof exists, and the fundamental reason is because the first content ("adnte") is input due to a typographical error by the user.

When the first content ("adnte") is input due to a typographical error by the user as described above, the electronic device 200 may not specify which letter corresponds to the typographical error in the first content. Therefore, the number of words to be displayed in the candidate word display area 240 may be very large. Any letter constituting the first content may be mistakenly inserted, or any letter constituting the first content may be input instead of a letter intended to be input by the user. For example, a word (e.g., "adventure") including all the letters constituting the first content ("adnte") may be displayed in the candidate word display area 240, and under the premise that "n" is mistakenly inserted in the first content, a word (e.g., "advertise") including all the remaining letters except for "n" may be displayed in the candidate word display area 240. Therefore, the probability that the word displayed in the candidate word display area 240 will be a word satisfying the original intention of the user may be very low.

In order to overcome the above-described problems, the electronic device 200 may display the multiple icons 232, 234, and 236 respectively corresponding to different lengths, and may predict at least one word satisfying the user's intention, in response to a user input for one of the icons.

For example, when a user input for the M icon 234 is detected, Referring to FIG. 11B, the electronic device 200 may determine at least one word (e.g., "andante", "adventure", and "adjective") which belongs to a length range corresponding to the M icon 234 and includes at least a part of the first content, and may display the same in the candidate word display area 240. When a user input for the M icon 234 is detected, the electronic device 200 may display an M icon 235 having an oblique-line pattern added thereto.

Referring to FIG. 11C, the electronic device 200 may detect a second input for selection of one word (e.g., "adjective") from among the at least one word displayed in the candidate word display area 240, and may display a selected word in the text input area 230.

The embodiment disclosed in FIGS. 11A, 11B, and 11C relieves the user of the burden of having to input a word with correct spelling.

FIGS. 12A, 12B, 12C and 12D illustrate a user interface provided by an electronic device on the basis of a word class of a word according to various embodiments of the disclosure.

Referring to FIG. 12A, the electronic device 200 may display a user interface including the text input area 230 and the keyboard 220. When the electronic device 200 detects, through the keyboard 220, a first input for display of a first content ("com") in the text input area 230, in the text input area 230, the electronic device 200 may display the first content, and may display a user interface configured to specify a length range (e.g., the multiple icons 232, 234, and 236) and a user interface configured to specify a word class (e.g., an N icon 242, a V icon 244, and an Ad icon 246). The N icon 242 may signify a noun, the V icon 244 may signify a verb, and the Ad icon 246 may signify an adjective.

In an embodiment, even before the electronic device 200 detects the user interface configured to specify a length range or the user interface configured to specify a word class, the electronic device 200 may display at least one word including at least a part of the first content. For example, the electronic device 200 may display words (e.g., "come", "communication", and "common"), of which length ranges or word classes are not specified and which have various length ranges and various word classes, in the candidate word display area 240.

In an embodiment, the electronic device 200 may detect a user input for the user interface configured to specify a length range and a user input for the user interface configured to specify a word class. For example, the electronic device 200 may detect a user input for selection of the M icon 234 and a user input for selection of the V icon 244.

In an embodiment, although not illustrated, even when there is no user input for the user interface configured to specify a word class, the electronic device 200 may determine a word class or may reduce a selectable word class candidate group, on the basis of at least a part of the first content (e.g., when the first content is a sentence, the context of the sentence) input in the text input area 230. For example, when the first content input in the text input area 230 ends with a noun, the electronic device 200 may reduce a selectable word class candidate group to a verb and an adjective from among a noun, a verb, and an adjective. When a selectable word class candidate group is a single word class, a word class may be specified.

Referring to FIG. 12B, the electronic device 200 may change display of icons selected by a user, or may give the selected icons with an effect notifying of selection of the icons by the user. For example, the electronic device 200 may display the M icon 235 having an oblique-line pattern added thereto and the N icon 243 having an oblique-line pattern added thereto.

In an embodiment, the electronic device 200 may newly display at least one related to the selected icons in the candidate word display area 240. For example, when the M icon 234 and the N icon 242 are selected, the electronic device 200 may display, in the candidate word display area 240, at least one word (e.g., "committee", "command", and "component") which has a length in a length range corresponding to the M icon 234, has a word class corresponding to the N icon 242, and starts with the first content ("com").

Referring to FIG. 12C, the electronic device 200 may receive a second input for selection of one of the at least one word displayed in the candidate word display area 240. For example, the electronic device 200 may receive a second input for selection of "command".

Referring to FIG. 12D, the electronic device 200 may display the selected word in the text input area 230. The electronic device 200 may replace the first content ("com"), displayed in the text input area 230, by the selected word ("command"), and may display the selected word in the text input area 230.

Referring to FIGS. 12A, 12B, 12C, and 12D, the description has been made of an embodiment for providing a predictive word to a user on the basis of a user input for a user interface configured to specify a length (or a range of a length) of a word and a user input for a user interface configured to specify a word class. However, it is also possible to implement an embodiment for providing a predictive word to a user on the basis of only a user input for a user interface configured to specify a word class.

The embodiment disclosed in FIGS. 12A, 12B, 12C, and 12D allows an improvement in the efficiency of learning of a word in any language.

Figure 13A:
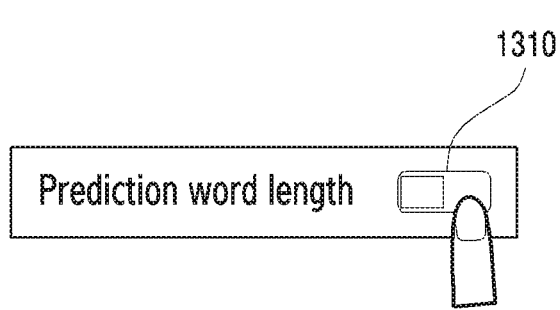
FIGS. 13A and 13B illustrate a user interface for configuring a length range corresponding to a particular object according to various embodiments of the disclosure.
Figure 13B:
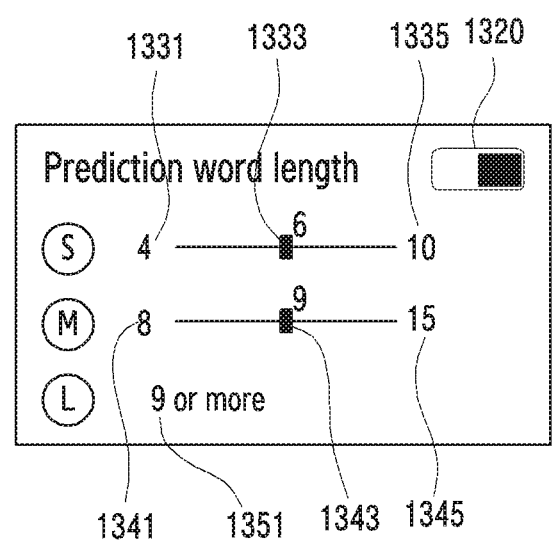

FIGS. 13A and 13B illustrate a user interface for configuring a length range corresponding to a particular object according to various embodiments of the disclosure.

In an embodiment, the user interfaces disclosed in FIGS. 13A and 13B may be provided to a user before the embodiment disclosed in FIG. 4 is implemented. That is, the embodiment disclosed in FIG. 4 may be implemented after a length range corresponding to a particular object (e.g., the S icon 232) is configured according to user inputs entered through the user interfaces disclosed in FIGS. 13A and 13B.

Referring to FIG. 13A, the electronic device 200 may receive a user's configuration of whether to receive a predictive word-providing service according to an embodiment. For example, the electronic device 200 may provide a user interface 1310 configured to receive a user's configuration of whether to receive a predictive word-providing service, in an individual application (e.g., a messenger application) or in a particular application (e.g., a control panel) for defining an overall configuration or environment of the electronic device 200.

In an embodiment, when a user input through the user interface 1310 for activation of a length-based predictive word-providing function is detected, as disclosed in FIG. 13B, a user interface for specifically configuring a length range may be additionally provided. When the user interface for specifically configuring a length range is provided, an object or indicator 1320 notifying of activation of the length-based predictive word-providing function may be provided therewith.

Referring to FIG. 13B, the electronic device 200 may provide the user interface for specifically configuring a length range. The user interface disclosed in FIG. 13B may also be provided in an individual application or in a particular application for defining an overall configuration or environment of the electronic device 200. Through the user interface disclosed in FIG. 13B, the electronic device 200 may help individual users personalize a length range of a word according to each user's need. As described above with reference to the drawings, a user interface configured to specify a length range (e.g., the multiple icons 232, 234, and 236 of FIGS. 6A, 6B, 6C, and 6D) may be provided together with a text input area (e.g., the text input area 230 of FIG. 2). The electronic device 200 may provide a user interface configured to receive a user's configuration of a length range corresponding to one icon among the multiple icons.

For example, the electronic device 200 may display a lower limit 1331, an upper limit 1335, and an adjustment bar 1333 in order to receive the configuration of a length range corresponding to the S icon 232. For example, when the user moves the adjustment bar 1333 and configures the same as a length of 6, the electronic device 200 may determine that a length range corresponding to the S icon 232 is 6 or less with reference to the number of letters.

As another example, the electronic device 200 may display a lower limit 1341, an upper limit 1345, and an adjustment bar 1343 in order to receive the configuration of a length range corresponding to the M icon 234. For example, when the user moves the adjustment bar 1343 and configures the same as a length of 9, the electronic device 200 may determine that a length range corresponding to the M icon 234 is 7-9 inclusive with reference to the number of letters. In an embodiment, when the user moves the adjustment bar 1343 and configures the same as a length of 9, the electronic device 200 may determine that a length range corresponding to the M icon 234 is 7-9 inclusive with reference to the number of letters, and that a length range corresponding to the L icon 236 is 9 (as indicated by reference numeral 1351) or more with reference to the number of letters.

In an embodiment, the electronic device 200 may set a lower limit or an upper limit (e.g., the upper limit 1335) to have different values according to types of languages. For example, when a default language is changed from English to Korean or Chinese, the electronic device 200 may reduce the value of the lower limit or the upper limit on the basis of a designated difference or a designated ratio. This is because the number of letters constituting a word in Korean or Chinese is less than in English.

In an embodiment, when the user interface disclosed in FIG. 13B is provided in an individual application (e.g., a messenger application), the electronic device 200 may automatically recognize a language of a first content input in the text input area 230, and may determine (or change) a value of a lower limit or an upper limit on the basis of the recognized language. For example, in a state in which a length range corresponding to the S icon 232 is configured as 6 or less with reference to the number of letters, when the user inputs a first content in Korean rather than English in the text input area 230, the electronic device 200 may reduce a length range (e.g., 4 or less with reference to the number of letters) corresponding to the S icon 232 by a designated ratio.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a touch-screen display;
   at least one processor configured to be operatively connected to the touch-screen display; and
   a memory configured to be operatively connected to the at least one processor,
   wherein the memory is configured to store instructions that, when executed, cause the at least one processor to:
   control the touch-screen display to display a user interface including a text input area and a keyboard, on the touch-screen display,
   receive a first input through the keyboard, the first input including a part of a word,
   in response to the first input, control the touch-screen display to display icons for selecting a length range of words on the touch-screen display, the icons comprising a first icon corresponding to a first length range of words and a second icon corresponding to a second length range of words which is not included in the first length range of words,
   in response to detecting a user input selecting the first icon among the icons, predict at least one word based on at least a portion of the part of the word and a length range corresponding to the selected first icon,
   control the touch-screen display to display the at least one predicted word on the touch-screen display,
   control the touch-screen display to receive a second input for selecting one word among the at least one predicted word, and
   control the touch-screen display to display the selected word on the text input area.

2. The electronic device of claim 1, wherein the user interface further comprises:
   the first icon of the icons configured to select the first length range; and
   the second icon of the icons configured to select the second length range greater than the first length range.

3. The electronic device of claim 2, wherein the first icon and the second icon are displayed in the text input area or outside of and adjacent to the text input area.

4. The electronic device of claim 3, wherein the instructions further comprise instructions that, when executed, cause the at least one processor to:
   control the touch-screen display to display the at least one predicted word between the text input area and the keyboard; and
   control the touch-screen display to display the first icon and the second icon in the text input area.

5. The electronic device of claim 2, wherein the instructions further comprise instructions that, when executed, cause the at least one processor to provide the user interface further configured to adjust at least one of the first length range or the second length range.

6. The electronic device of claim 2, wherein the instructions further comprise instructions that, when executed, cause the at least one processor to determine a length of at least one range among the first length range and the second length range based on a type of a language corresponding to the first input.

7. The electronic device of claim 1, wherein the instructions further comprise instructions that, when executed, cause the at least one processor to display the icons indicating a selection of an icon corresponding to a length range of the at least one predicted word based on an input characteristic of at least a part of the first input.

8. The electronic device of claim 1, wherein the instructions further comprise instructions that, when executed, cause the at least one processor to provide the user interface further configured to specify a word class of the at least one word.

9. The electronic device of claim 1, wherein the predicted at least one word shares at least one letter with the part of the word.

10. An operating method of an electronic device, the operating method comprising:
    displaying a user interface including a text input area and a keyboard, on a touch-screen display;
    receiving a first input through the keyboard, the first input including a part of a word;
    in response to the first input, displaying icons for selecting a length range of words on the touch-screen display, the icons comprising a first icon corresponding to a first length range of words and a second icon corresponding to a second length range of words which is not included in the first length range of words;

in response to detecting a user input selecting the first icon among the icons, predicting at least one word based on at least a portion of the part of the word and a length range corresponding to the selected first icon;

displaying the at least one predicted word on the touch-screen display;

receiving a second input for selecting one word among the at least one predicted word through the touch-screen display; and displaying the selected word on the text input area.

11. The operating method of claim 10, wherein the user interface comprises:

the first icon of the icons configured to select the first length range; and the second icon of the icons configured to select the second length range greater than the first length range.

12. The operating method of claim 11, wherein the first icon and the second icon are displayed in the text input area or outside of and adjacent to the text input area.

13. The operating method of claim 12, further comprising:

displaying the at least one word between the text input area and the keyboard; and displaying the first icon and the second icon in the text input area.

14. The operating method of claim 11, further comprising:

providing the user interface further configured to adjust at least one of the first length range or the second length range.

15. The operating method of claim 11, further comprising:

determining a length of at least one range among the first length range and the second length range based on a type of a language corresponding to the first input.

16. The operating method of claim 10, further comprising:

display the icons indicating a selection of an icon corresponding to a length range of the at least one predicted word based on an input characteristic of at least a part of the first input.

17. The operating method of claim 10, further comprising:

providing the user interface further configured to specify a word class of the at least one word.

18. The operating method of claim 10, wherein the predicted at least one word shares at least one letter with the part of the word.

* * * * *